United States Patent [19]

McCrink

[11] 4,373,288

[45] Feb. 15, 1983

[54] SIGNALLING MEANS FOR A CRUSTACEAN TRAP

[76] Inventor: Michael P. McCrink, 43 Chapin Ave., Red Bank, N.J. 07701

[21] Appl. No.: 211,629

[22] Filed: Dec. 1, 1980

[51] Int. Cl.³ ...................... A01K 69/00; A01K 69/08
[52] U.S. Cl. ........................................ 43/100; 43/102; 441/26
[58] Field of Search ................ 43/102, 103, 105, 100, 43/17, 58; 116/26; 114/326; 9/9

[56] References Cited

U.S. PATENT DOCUMENTS

| | | | |
|---|---|---|---|
| 1,178,094 | 4/1916 | Neal | 114/326 |
| 2,279,829 | 4/1942 | Lyon | 114/326 |
| 2,489,856 | 11/1949 | Buford | 43/102 |
| 2,682,245 | 6/1954 | Pinch | 114/326 |
| 2,820,971 | 1/1958 | Welsh | 9/9 |
| 3,055,139 | 9/1962 | Condello | 43/102 X |
| 3,772,818 | 11/1973 | Gardina | 43/17 |
| 4,262,379 | 4/1981 | Jankiewicz | 43/100 |

*Primary Examiner*—Nicholas P. Godici
*Assistant Examiner*—M. Jordan
*Attorney, Agent, or Firm*—Stanley W. Sokolowski

[57] ABSTRACT

The invention, according to the depicted embodiment, comprises a buoyant element which is releaseably held atop a crustacean trap by an elongate rod. One end of the rod releaseably engages the buoyant element, and the other end thereof is passed through the trap and suspends bait therewithin. Upon a crustacean seizing the bait, and attempting to remove it from the rod, the latter comes free of the buoyant element which, in turn, rises to surface upon the water. In the preferred embodiment depicted, the buoyant element is tethered to the crustacean trap for recovery purposes.

8 Claims, 4 Drawing Figures

SIGNALLING MEANS FOR A CRUSTACEAN TRAP

This invention pertains to fishery, and in particular to means for sensibly signalling the presence of a crustacean within a trap therefor.

As is well known, the popular method of fishing for crustacean comprises the dropping of a gridded box to the bottom of a bay or river bnak, or the like. The sides of the box, upon the latter coming to rest, fall open to expose bait which as been fixed therein. The sea life that comes to consume the bait does so at the site. If the fisherman's intuition is good, he will lift the trap at an opportune time—snaring the crustacean or whatever therewithin. More often than not, however, the fisherman raises his trap only to find that the bait is gone, and so is the sea life which devoured it, or the bait is still intact, but there is no sea life therewithin. What has been needed is a sure signalling means for such traps to alert the fisherman when crustacean or other sea life is endeavoring to take the bait, and tearing it from its attachment within the trap.

It is an object of this invention to set forth such a signalling means. It is also an object of this invention to disclose such signalling means which can be readily fixed to existing crustacean traps with no need to modify or alter the latter.

It is particularly an object of this invention to teach signalling means for a crustacean trap comprising a buoyant element; and means releaseably engaging said buoyant element (a) for holding said element on a crustacean trap, and (b) for suspending bait within such trap.

Further objects of this invention, as well as the novel features thereof, will become more apparent by reference to the following description, taken in conjunction with the accompanying figures, in which.

Figure 3:
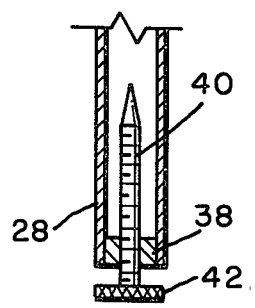
FIG. 3 is a fragmentary, elevational cross-sectional view of the pendant end of the coupling rod.

As shown in the figures, an embodiment 10 of my invention comprises a buoyant element 12 set upon a base plate 14. The element 12 is hollow and, as shown, is formed of plastic. However, rubber, wood, or other materials could be used, as one chooses. The element 12 is substantially bulbous, but has a necked-down portion 16 and an open, flared mouth 18. Set into an annular recess provided therefor, within the necked-down portion 16, is a plastic disk 20. The disk 20 has a central aperature 22 formed therein, and outwardly therefrom are a plurality of slits 24. The slits 24 define flaps which serve as penetratable detents for the flared end 26 of a coupling rod 28.

The coupling rod 28 both releaseably holds the buoyant element 12 atop a crustacean trap 30 and suspends bait within the trap. The flared, upper end 26 of the rod is forced through the disc 20 to be held thereafter by the flaps. A washer 32 and cotter pin 34 prevent the rod from penetrating too far into the element 12, and from falling from the assembly to the sea floor when the flared end has been extracted from disc 20. The base plate 14 has a central aperture 36 for admitting the flared end 26 of the rod therethrough.

The lower end of the rod (FIG. 3) carries a threaded nut 38. The nut 38 receives a threaded skewer 40 which has a knurled head 42. The skewer is forced through bait (chicken necks, or the like), and engaged with the nut 38, whereby to fix the bait in place within the trap 30.

Figure 1:
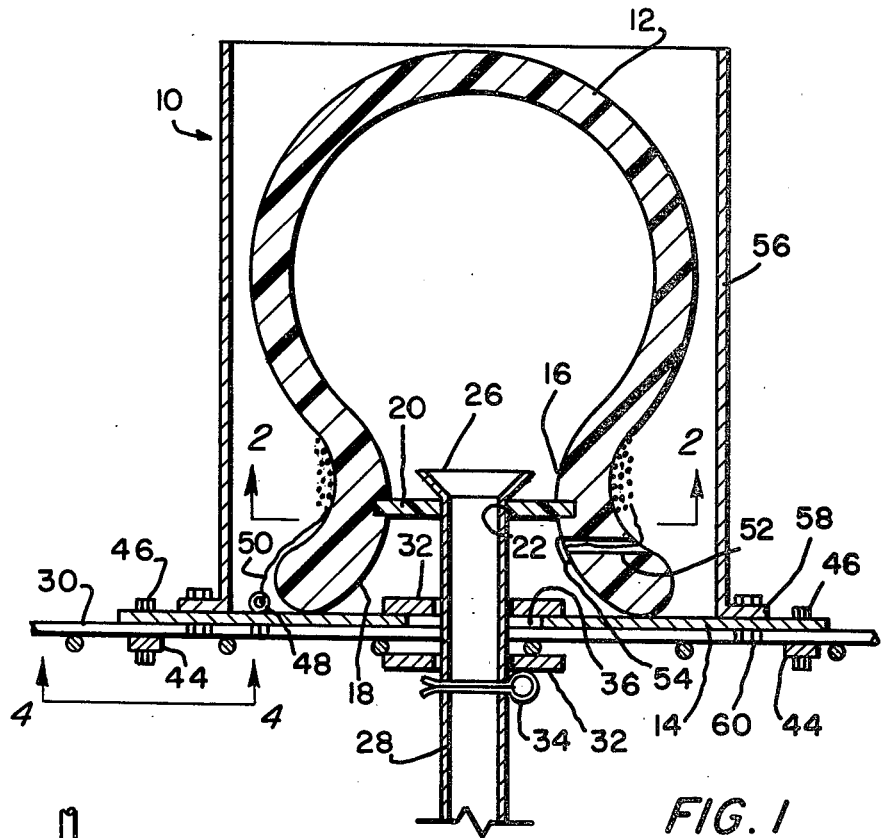
FIG. 1 is an elevational cross-section of an embodiment of the novel signalling means of my invention.
Figure 4:
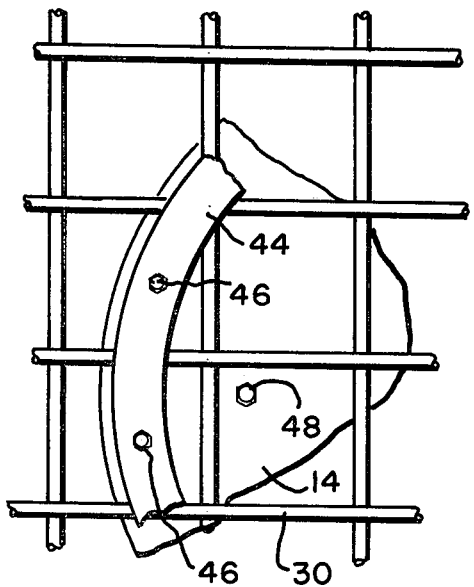
FIG. 4 is a fragmentary, bottom view, taken at 4—4 of FIG. 1, depicting the means for fastening the base plate to the top of a crustacean trap.
Figure 2:
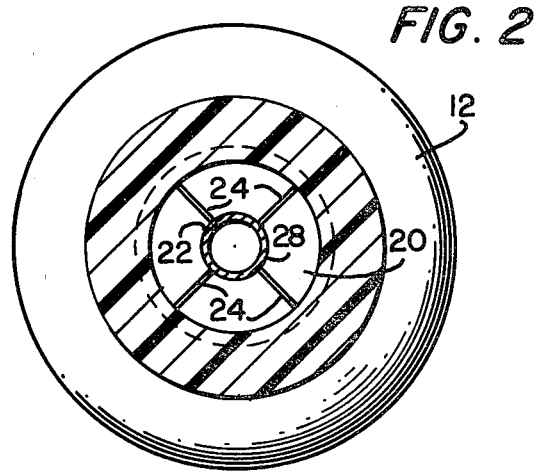
FIG. 2 is a cross-section taken along section 2—2 of FIG. 1.

The base plate 14 is secured atop the trap 30 by means of an annular retainer 44. The retainer 44 is disposed against the top grid of the trap 30, and fasteners 46 are secured through mating holes in the plate 14 and retainer 44. As shown, particularly in FIGS. 1 and 4, the top grid of the trap 30 is of the conventional open-work wire type, and defines the flat top of the trap 30. The open-work wire of the top grid facilitates the replaceable attachment of embodiment 10 thereto, and will accommodate such attachment in any one of a plurality of positions thereupon. The coupling rod 28 has only to be passed through a selected one of the apertures defined by the top grid, and the plate 14 and retainer 44 set and oriented wherever the fasteners 46 will avoid the open-work wire. Thus it is, that the embodiment 10 can be readily fixed to conventional, existing crustacean traps, such as trap 30, with no need to alter or modify the structure of the latter.

In order that the buoyant element 12 can be retrieved, it is tethered to the base plate. The base plate has an eye-bolt 48 fixed thereto which secures one end of fishing line 50. The line 50 is loosely wrapped a number of times about the necked-down portion 16 of the buoyant element 12, and the other end is passed through a borehole 52 formed through the element 12. Within the element 12, the other end is secured with a button 54; the outer ends of the borehole 52 have grommets fixed therein to insure that the line does not cut the element 12.

When the trap 30 is dropped into water, and comes to rest on the bottom, as is conventional, the sides thereof (not shown) fall open. Accordingly, the bait fixed by the skewer 40 is suspended within the trap. Upon a crustacean or other sea life arriving, and proceeding to tear at the bait, the rod is pulled downwardly and comes free of the buoyant element 12. Hence, the latter is free to rise to the surface of the water—turning, and paying-out line 50 as it does so. When it has surfaced, the fisherman knows that something is in his trap, working the bait. Of course, to render the buoyant element 12 especially visible, it should be of some garish or bright color.

It is possible that the usual trap lines (not shown) could ensnare the buoyant element 12, on the trap 30 being dropped into the water, and inadvertently dislodging the element. Also, passing fish could do likewise: nuzzle the element 12 and free it from the rod 28 when, in fact, there is no crustacean or sea life within the trap. For this reason, I provide a shield 56 to protect the element 30 against disturbance and insure that it will not get snared by the trap lines. The shield 56 is simply a cylindrical wall having a mounting flange 58 at the one end thereof. Flange 58 is bolted to the base plate 14 by fasteners 60. The inner surface of the shield 56 and the outer surface of the element 12 define a generous clearance therebetween; hence, the shield does not interfere with the release and surfacing of the element 12.

While I have described my invention in connection with a specific embodiment thereof, it is to be clearly understood that this is done only by way of example and not as a limitation to the scope of my invention as set forth in the objects thereof and in the appended claims. For instance, as explained herein, the invention comprises means for releaseably engaging a buoyant element (and suspending bait within a trap). Now, while I disclose a tethered, buoyant element in the preferred embodiment, other arrangements will occur to others, by taking teaching from my disclosure. In an alternative arrangement, the buoyant element could be free and detached from the "operative" rod, upon the rod withdrawing therefrom. Also, within the shield 56, and between the inner wall of the shield and the flared end 26 of the rod, one can interpose a rubber ball or expanded balloon—in lieu of element 12. Then, upon the rod 28 moving downwardly, as the bait is being worked, it will deform the rubber ball (or balloon) and proceed past it, and the latter will rise from the shield to surface. Such a surfacing article, of little expense, need not be tethered; it can be expendable. In another arrangement, the rod 28 could have a pair of spring "fingers", with which to clasp a rubber ball (or the like) and the base plate 14 can have a bar fixed across the aperture 36. Thus, the "fingers" would be passed through the aperture 36, astride the bar, to clasp the ball. Subsequently, when the working of the bait causes the rod to descend, the ball will be barred from passing through the aperture 36 and, when free of the "fingers", will surface.

The foregoing, and all such alternative embodiments of the novel signalling means, are deemed to be within the ambit of my teaching and comprised by the scope of my invention and claims.

I claim:

1. Signalling means, for replaceable attachment thereof to a crustacean trap, which trap has an open-work wire, or equivalent-structured, substantially flat, top grid, said signalling means comprising:
   means defining a substantially flat base for emplacement thereof, selectively, in any one of a plurality of positions, upon such an open-wire, or equivalent-structured, substantially flat, top grid of a crustacean trap;
   means for removably retaining said base upon such top grid:
   a buoyant element; and
   means coupled to said base releasably engageable with said buoyant element (a) for holding said element on such top grid, and (b) for suspending bait within such trap below such top grid.

2. Signalling means, according to claim 1, wherein:
   said holding and suspending means comprises a dual-ended coupling having means on one end thereof for holding said element externally of a crustacean trap, and means on the opposite end for securing bait thereto internally of a crustacean trap.

3. Signalling means, according to claim 2, wherein:
   said securing means comprises a threaded skewer.

4. Signalling means, according to claim 1, further including:
   means for tethering said buoyant element to a crustacean trap.

5. Signalling means, according to claim 4, wherein:
   said tethering means comprises a length of filamentary material having one end thereof coupled to said buoyant element, an anchorage for fixing thereof to a crustacean trap, and the other end of said material being fixed to said anchorage.

6. Signalling means, according to claim 5, wherein:
   said flat base comprises said anchorage.

7. Signalling means, according to claim 1, further including:
   means replaceably coupled to said base for substantially enveloping said buoyant element to shield the latter.

8. Signalling means, according to claim 6, further including:
   a walled shield, fixed to said base, for circumscribing and shielding said buoyant element.

* * * * *